United States Patent
Chen et al.

(10) Patent No.: US 11,872,538 B2
(45) Date of Patent: Jan. 16, 2024

(54) PREPARATION METHOD AND APPLICATION OF SCALLOP SHELL EXTRACT EFFICIENT ADSORBENT

(71) Applicant: Shandong University, Weihai (CN)

(72) Inventors: Jingdi Chen, Fuzhou (CN); Panpan Pan, Weihai (CN); Hongbo Wang, Weihai (CN); Kuangqi Yan, Weihai (CN); Jianing Han, Weihai (CN)

(73) Assignee: SHANDONG UNIVERSITY, Weihai (CN)

( * ) Notice: Subject to any disclaimer, the term of this patent is extended or adjusted under 35 U.S.C. 154(b) by 0 days.

(21) Appl. No.: 18/109,743

(22) Filed: Feb. 14, 2023

(65) Prior Publication Data

US 2023/0264173 A1    Aug. 24, 2023

(30) Foreign Application Priority Data

Feb. 18, 2022    (CN) .......................... 2022101486702

(51) Int. Cl.
*B01J 20/30*    (2006.01)
*B01J 20/24*    (2006.01)

(52) U.S. Cl.
CPC .......... *B01J 20/3021* (2013.01); *B01J 20/24* (2013.01); *B01J 20/3071* (2013.01); *B01J 20/3078* (2013.01); *B01J 20/3085* (2013.01); *B01J 2220/4881* (2013.01)

(58) Field of Classification Search
CPC ........ B01J 20/30; B01J 20/3021; B01J 20/24; B01J 20/3071; B01J 20/3078; B01J 20/3085; B01J 20/4881

USPC ........................................................ 502/401
See application file for complete search history.

(56) References Cited

FOREIGN PATENT DOCUMENTS

CN    113042009 A    6/2021

OTHER PUBLICATIONS

CNIPA, Notification of a First Office Action for CN202210148670.2, dated Nov. 2, 2022.
Shandong University (Applicant), Reply to Notification of a First Office Action for CN202210148670.2, w/ (allowed) replacement claims, dated Nov. 15, 2022.
CNIPA, Notification to grant patent right for invention in CN202210148670.2, dated Jan. 20, 2023.

*Primary Examiner* — Edward M Johnson
(74) *Attorney, Agent, or Firm* — Zhigang Ma

(57) ABSTRACT

A preparation method and an application of a scallop shell extract efficient adsorbent are provided. The adsorbent employs waste scallop shells as a primary raw material, and converts the scallop shells into an extract with excellent adsorption performance by heating and multiple times of extraction with acetic acid. The prepared scallop shell extract is used as an efficient adsorbent to be applied to adsorption of aqueous solution dyes and shows good adsorption performance. The preparation method has a simple preparation process, realizes high-value utilization of the waste scallop shells, effectively lightens the environmental burden, reduces shell pollution and waste, has low cost and high renewable efficiency, and has good ecological benefit and economic value.

6 Claims, 4 Drawing Sheets

PREPARATION METHOD AND APPLICATION OF SCALLOP SHELL EXTRACT EFFICIENT ADSORBENT

TECHNICAL FIELD

The disclosure relates to the field of inorganic material preparation technologies, and particularly to a preparation method of a scallop shell extract efficient adsorbent, which has low cost, is green and environment-friendly, and can effectively adsorb dyes.

BACKGROUND

With the rapid development of agriculture, industry and medicine and the change of human lifestyle, a large number of wastewaters containing various pollutants are discharged into the environment, which pose a serious threat to the ecological environment and human health. Wastewater pollutants can be classified into heavy metal ions ($Cu^{2+}$, $Zn^{2+}$, $Cd^{2+}$, etc.), organic compounds (dyes, antibiotics, herbicides, pesticides, etc.), and nutrients (phosphates, nitrates, etc.). Different pollutants have different impacts on the environment, depending on types, natures, contents and degradation pathways of the pollutants. If water pollutants are ingested through drinking water, it will lead to different diseases and even death of organisms. The treatment of water pollutants has become one of most important issues in environmental remediation. Dyes are one kind of traditional wastewater pollutants, which are usually used in food, paper, textile, plastics, cosmetics, biopharmaceuticals, printing and dyeing industries. A dye molecule contains a complex chemical structure of chromogen-chromosphere, which makes it difficult to be biodegraded. Moreover, the dyes are harmful to human health and aquatic ecological environment. Therefore, removal of the dyes before they are discharged into wastewaters has become one of the most important issues in environmental remediation.

Various dye treatment technologies have been developed, such as a coagulation/flocculation method, a biodegradation method, an electrochemical oxidation method, an ion exchange method, an electrocoagulation method, an adsorption method, a reverse osmosis method, etc. Among them, the adsorption method is a clean, economical, efficient and large-scale applicable dye treatment technology, which can bind particles on surfaces of adsorbents by physical or chemical forces. Therefore, the adsorption method is used as a common method of wastewater treatment. Most of adsorbents have excellent characteristics such as renewability, simple operation and high adsorption efficiency. Traditional adsorbents are activated carbon, clay minerals, anionic clays, etc. However, these adsorbents cannot be used for a long time and in a large scale resulting from problems in adsorption capacity, regeneration efficiency, cost, reusability and the like. Therefore, the development of green adsorbents with low cost, environmental protection, high efficiency and high renewable efficiency has become a research focus of researchers.

China is one of largest marine production countries in the world, shellfish is a main farming species in China. In recent years, the output of shellfish has been ranked first in the world, and scallop is one of main farming species of the shellfish. In the year of 2019, the output of scallop mariculture in China reached 14,389,727 tons. According to statistics, every 1,000 grams of shellfish processed will produce 300-700 grams of waste shells. However, due to the limitation of shell processing and utilization technology, the utilization rate and added value of scallop shells are still at low levels, resulting in a great waste of resources and environmental pollution, which is not conducive to the construction of ecological civilization and sustainable development in coastal areas of China. However, the scallop shell is a natural bio-mineral resource, which has been developed and used in soil alkalization materials, desulfurization materials, biological fillers, antibacterial materials, animal feed, adsorption materials, disinfectants and other fields, because of its high alkalinity, high calcium content, crystal morphology and composition structure.

In order to solve the problems of waste scallop shell pollution and wastewater dye pollution, the disclosure aims to propose using the scallop shell as a calcium source and converting the scallop shell into an extract with excellent adsorption performance by heating and multiple times of acetic acid extractions, and applying prepared extract of scallop shell as an efficient adsorbent for the adsorption of aqueous solution dyes. The adsorbent has a good porous microsphere structure and shows good adsorption capacity for a variety of dyes such as Coomassie brilliant blue, Congo red, crystal violet and so on, and is expected to become a new green and environmentally friendly adsorbent.

SUMMARY

A purpose of the disclosure is to solve the problems of a large number of discards, low utilization rate and low added value of scallop shells, and dye pollution of wastewater, and thus the disclosure provides a preparation method of a scallop shell extract with efficient dye adsorption performance, which may have advantages of simple preparation process, low cost and good dye adsorption effect. The prepared scallop shell extract P3 has a porous microsphere structure with a diameter of 5-10 micrometers (μm), and has a good adsorption effect on dyes in water.

In order to achieve the purpose, the disclosure proposes the following technical solutions.

A preparation method of a scallop shell extract efficient adsorbent, includes the following steps:

(1) rinsing scallop shells with water to remove impurities on surfaces of the scallop shells, and then naturally air-drying;

(2) crushing air-dried scallop shells into small pieces, and heating in an oven to obtain heat-treated scallop shells (HSS);

(3) putting the HSS into a thermostatic water bath oscillator (150 rpm, 25° C.) to react with acetic acid for 24 h, pouring out a residual solution (R1) of the reaction solution for storage, taking out remaining scallop shells (RSS1), rinsing three times with deionized water and drying, and drying the remaining precipitate (P1) for later use;

(4) reacting the RSS1 with acetic acid in the thermostatic water bath oscillator at 25° C. for 24 h, decanting a residual solution (R2) for storage, taking out remaining scallop shells (RSS2), rinsing three times with deionized water and drying for later use, and drying the remaining precipitate (P2) for later use;

(5) reacting the RSS2 and acetic acid in the thermostatic water bath oscillator (150 rpm, 25° C.) for 24 h, rinsing remaining scallop shells (RSS3) three times with deionized water and drying, pouring out a residual solution (R3) of the reaction solution for storage, and drying remaining precipitate (P3) for later use;

(6) reacting the RSS3 with acetic acid in the thermostatic water bath oscillator (150 rpm, 25° C.) for 24 H to completely dissolve, and storing a residual solution (R4); and (7) combining the R1, R2, R3 and R4 to prepare a calcium supplement, wherein a primary ingredient of each of the R1, R2, R3 and R4 is $Ca(CH_3COO)_2$, which is a good calcium supplement.

In some embodiments, process parameters in the above steps are as follows:

in the step (2), a heating temperature is in a range of 160° C. to 180° C., and a heating time is in a range of 70 h to 75 h;

in the step (3), a mass of the HSS is in a range of 14.5 g to 15.5 g, a concentration of an acetic acid solution is 5 Vol. %, and a volume of the acetic acid solution is in a range of 220 mL to 230 mL.

in the step (4), a mass of the RSS1 is in a range of 6 g to 7 g, a concentration of an acetic acid solution is 5 Vol. %, and a volume of the acetic acid solution is in a range of 70 mL to 80 mL.

in the step (5), a mass of the RSS2 is in a range of 3.5 g to 4.5 g, a concentration of an acetic acid solution is 5 Vol. %, and a volume of the acetic acid solution is in a range of 70 mL to 80 mL.

in the step (6), a mass of the RSS3 is in a range of 0.8 g to 1.2 g, a concentration of an acetic acid solution is 5 Vol. %, and a volume of the acetic acid solution is in a range of 45 mL to 55 mL.

A use of the scallop shell extract efficient adsorbent in dye absorption, may specifically include:

(1) preparing 100 mg/L aqueous solution containing a dye at room temperature;

(2) accurately taking 50 mL of the aqueous solution containing the dye prepared in step (1) at room temperature, adding 0.05 g of the scallop shell extract efficient adsorbent into the taken aqueous solution, and then putting the aqueous solution added with the scallop shell extract efficient adsorbent in a thermostatic water bath oscillator at 120 r/min for oscillation for 24 h;

(3) standing and filtering a turbid solution formed in the step (2) after completion of absorption at room temperature, and measuring a concentration of residual dye in the obtained filtrate by an ultraviolet-visible (UV-visible) spectrophotometer;

(4) calculating an adsorption rate according to concentrations of the dye in the solution before and aft adsorption;

(5) separating by centrifugation and drying the P3 after the absorption is completed, and then putting into 0.1 M (mol/L) NaOH solution (100 mL) for oscillation (120 rpm, 24 h, 25° C.) for analysis, and performing sample recovering by suction filtration after the analysis; and (6) repeating the steps (2), (3), (4) and (5) for three cycles.

The disclosure may achieve advantages as follows.

(1) the disclosure takes waste scallop shells as raw materials, and converts the scallop shells into an extract with excellent adsorption performance by heating and extracting with acetic acid for multiple times. After the heat treatment, a peral layer is arranged neatly, the layering with a prismatic layer is more obvious, and the separation is easy. The scallop shells are gradually dissolved by the acetic acid treatment for three times, the inner peral layer and the outer periostracum are firstly dissolved, and the middle prismatic layer is finally dissolved, so that the primary ingredient dissolved by the first two times of acid treatments is $CaCO_3$, and the primary ingredient dissolved by the third time of acid treatment is $Ca_2SiO_4$. Because that the scallop shells contain a small amount of organic matter, the formation of special crystal forms of the scallop shells can be regulated and controlled, and the organic matter is gradually released in the acid treatment process to induce P3 to form porous microsphere structures, so that the specific surface area and the effective adsorption area are greatly improved. According to the preparation method, a porous spherical adsorbent can be prepared without a complex process and other inducer or template agent, and the process is simple.

(2) the preparation method has wide raw material sources, develops high added-value utilization of the waste scallop shells, effectively lighten the environmental burden, reduces the pollution and waste of scallop shells, has low cost and high renewable efficiency, and has good ecological benefit and economic value.

(3) according to the disclosure, the preparation process is simple, the scallop shell extract efficient adsorbent P3 obtained by heat treatment and three times of acetic acid extraction has porous microsphere structures, and has a good crystalline morphology, small particle size, no agglomeration in the reaction process, and no need of adding a template agent or an inducer. The adsorbent has good adsorption capacity for dyes in aqueous solutions, and does not cause secondary pollution to water.

DETAILED DESCRIPTION OF EMBODIMENTS

Figure 1:
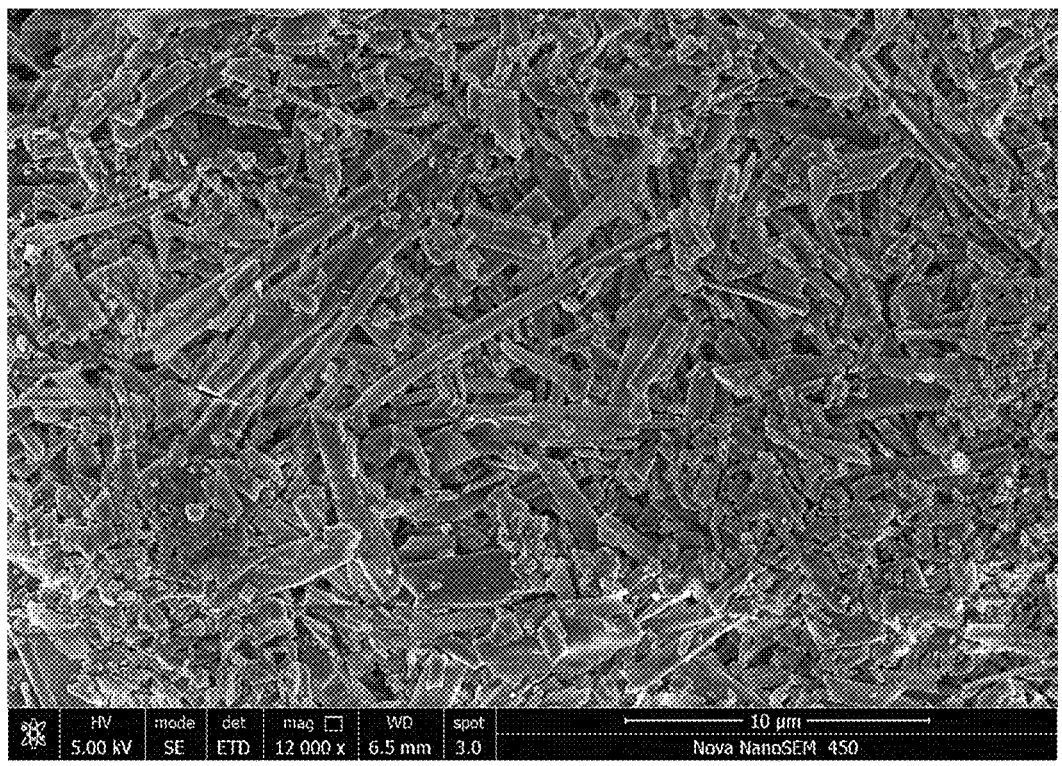
FIG. 1 illustrates a scanning Electron Microscope (SEM) image of the scallop shell extract P1 prepared in an embodiment 1 of the disclosure.

In order to make contents of the disclosure easier to understand, technical solutions of the disclosure are further described below in combination with specific embodiments. However, the following illustrated embodiments are only examples of the disclosure, and do not represent the scope of protection defined by the disclosure. The scope of protection of the disclosure is subject to the appended claims.

Embodiment 1

(1) rinsed and air-dried scallop shells were crushed into small pieces, and heated in an oven at 170 degrees Celsius (° C.) for 72 hours (h) to obtain heat-treated scallop shells (HSS).

(2) the HSS (15 grams) were put in a thermostatic water bath oscillator (150 rpm, 25° C.) to react with 5 Vol. % acetic acid (225 mL) for 24 h. The residual solution (R1) was poured out from the reaction solution and stored. The remaining scallop shells (RSS1) were taken out, rinsed three times with deionized water and dried. The remaining precipitate (P1) was dried for later use.

(3) the RSS1 (6.6 grams) were reacted with 5 Vol. % acetic acid (75 mL) at 25° C. for 24 h in the thermostatic water bath oscillator (150 rpm). The residual solution (R2) was decanted and stored. The remaining scallop shells (RSS2) were taken out, rinsed three times with deionized water, and dried for later use. The remaining precipitate (P2) was dried for later use.

(4) the RSS2 (4 grams) were reacted with 5 Vol. % acetic acid (75 mL) for 24 h in the thermostatic water bath oscillator (150 rpm, 25° C.). The remaining scallop shells (RSS3) were rinsed three times with deionized water and then dried. The residual solution (R3) was poured out from the reaction solution and stored. The remaining precipitate (P3) was dried, and thereby a scallop shell extract efficient adsorbent was obtained.

(5) the RSS3 (1 gram) were reacted with 5 Vol. % acetic acid (50 mL) in the thermostatic water bath oscillator (150 rpm, 25° C.) for 24 h to be completely dissolved, and the residual solution (R4) was stored.

(6) 100 mg/L aqueous solution containing Coomassie brilliant blue (CBB) was prepared at room temperature.

(7) 50 mL of the aqueous solution containing Coomassie brilliant blue in step (6) was accurately taken at room temperature, 0.05 grams of the prepared scallop shell extract (i.e., the above precipitate) P1 or P2 or P3 were added into the taken aqueous solution, and then the aqueous solution added with the prepared scallop shell extract is put in the thermostatic water bath oscillator at 120 r/min (revolutions per minute, also referred to as rpm) for oscillation for 24 h.

(8) the turbid solution formed in the step (7) after completion of absorption was stood and filtered at room temperature, and the concentration of residual dye in the obtained filtrate was measured by an ultraviolet-visible (UV-visible) spectrophotometer.

(9) the P3, after completed the absorption, was centrifugalized (for separation) and dried, and put in 0.1 M (mol/L) NaOH solution (100 mL) for oscillation (120 rpm, 24 h, 25° C.) for analysis. After the analysis, the sample was recovered by suction filtration.

(10) the steps (7), (8) and (9) were repeated for three cycles.

Embodiment 2

(1) rinsed and air-dried scallop shells were crushed into small pieces, and heated in an oven at 180° C. for 70 h to obtain heat-treated scallop shells (HSS).

(2) the HSS (15.5 g) were put in a thermostatic water bath oscillator (150 rpm, 25° C.) to react with 5 Vol. % acetic acid (230 mL) for 24 h. The residual solution (R1) was poured out from the reaction solution and stored. The remaining scallop shells (RSS1) were taken out, rinsed three times with deionized water and dried. The remaining precipitate (P1) was dried for later use.

(3) the RSS1 (6.6 g) were reacted with 5 Vol. % acetic acid (80 mL) at 25° C. for 24 h in the thermostatic water bath oscillator (150 rpm). The residual solution (R2) was decanted and stored. The remaining scallop shells (RSS2) were taken out, rinsed three times with deionized water, and dried for later use. The remaining precipitate (P2) was dried for later use.

(4) the RSS2 (4.5 g) were reacted with 5 Vol. % acetic acid (80 mL) for 24 h in the thermostatic water bath oscillator (150 rpm, 25° C.). The remaining scallop shells (RSS3) were rinsed three times with deionized water and then dried. The residual solution (R3) was poured out from the reaction solution and stored. The remaining precipitate (P3) was dried, and thereby a scallop shell extract efficient adsorbent was obtained.

(5) the RSS3 (1 g) were reacted with 5 Vol. % acetic acid (50 mL) in the thermostatic water bath oscillator (150 rpm, 25° C.) for 24 h to be completely dissolved, and the residual solution (R4) was stored.

(6) 100 mg/L aqueous solution containing Congo red was prepared at room temperature.

(7) 50 mL of the aqueous solution containing Congo red in step (6) was accurately taken at room temperature, 0.05 g of the prepared scallop shell extract (i.e., the above precipitate) P1 or P2 or P3 were added into the taken aqueous solution, and then the aqueous solution added with the prepared scallop shell extract is put in the thermostatic water bath oscillator at 120 r/min for oscillation for 24 h.

(8) the turbid solution formed in the step (7) after completion of absorption was stood and filtered at room temperature, and the concentration of residual dye in the obtained filtrate was measured by an UV-visible spectrophotometer.

(9) the P3, after completed the absorption, was centrifugalized (for separation) and dried, and put in 0.1 M NaOH solution (100 mL) for oscillation (120 rpm, 24 h, 25° C.) for analysis. After the analysis, the sample was recovered by suction filtration.

(10) the steps (7), (8) and (9) were repeated for three cycles.

Embodiment 3

(1) rinsed and air-dried scallop shells were crushed into small pieces, and heated in an oven at 160° C. for 75 h to obtain heat-treated scallop shells (HSS).

(2) the HSS (14.5 g) were put in a thermostatic water bath oscillator (150 rpm, 25° C.) to react with 5 Vol. % acetic acid (220 mL) for 24 h. The residual solution (R1) was poured out from the reaction solution and stored. The remaining scallop shells (RSS1) were taken out, rinsed three times with deionized water and dried. The remaining precipitate (P1) was dried for later use.

(3) the RSS1 (6 g) were reacted with 5 Vol. % acetic acid (70 mL) at 25° C. for 24 h in the thermostatic water bath oscillator (150 rpm). The residual solution (R2) was decanted and stored. The remaining scallop shells (RSS2) were taken out, rinsed three times with deionized water, and dried for later use. The remaining precipitate (P2) was dried for later use.

(4) the RSS2 (3.5 g) were reacted with 5 Vol. % acetic acid (70 mL) for 24 h in the thermostatic water bath oscillator (150 rpm, 25° C.). The remaining scallop shells (RSS3) were rinsed three times with deionized water and then dried. The residual solution (R3) was poured out from the reaction solution and stored. The remaining precipitate (P3) was dried, and thereby a scallop shell extract efficient adsorbent was obtained.

(5) the RSS3 (0.8 g) were reacted with 5 Vol. % acetic acid (45 mL) in the thermostatic water bath oscillator (150 rpm, 25° C.) for 24 h to be completely dissolved, and the residual solution (R4) was stored.

(6) 100 mg/L aqueous solution containing crystal violet was prepared at room temperature.

(7) 50 mL of the aqueous solution containing crystal violet in step (6) was accurately taken at room temperature, 0.05 g of the prepared scallop shell extract (i.e., the above precipitate) P1 or P2 or P3 were added into the taken aqueous solution, and then the aqueous solution added with the prepared scallop shell extract is put in the thermostatic water bath oscillator at 120 r/min for oscillation for 24 h.

(8) the turbid solution formed in the step (7) after completion of absorption was stood and filtered at room temperature, and the concentration of residual dye in the obtained filtrate was measured by an UV-visible spectrophotometer.

(9) the P3, after completed the absorption, was centrifugalized (for separation) and dried, and put in 0.1 M NaOH solution (100 mL) for oscillation (120 rpm, 24 h, 25° C.) for analysis. After the analysis, the sample was recovered by suction filtration.

(10) the steps (7), (8) and (9) were repeated for three cycles.

As illustrated in FIG. 1, the P1 has a sheet structure with a size of 1 μm to 10 μm.

Figure 2:
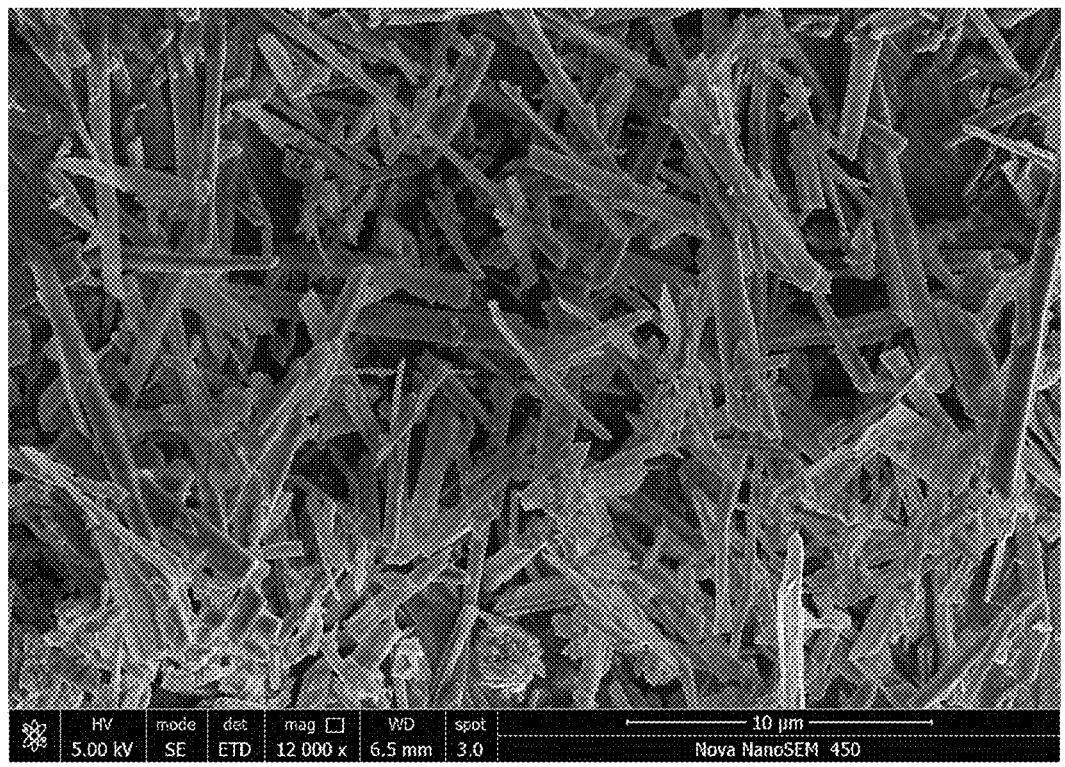
FIG. 2 illustrates a SEM image of the scallop shell extract P2 prepared in the embodiment 1 of the disclosure.

As illustrated in FIG. 2, the P2 has a sheet structure with a size of 1 μm to 10 μm.

Figure 3:
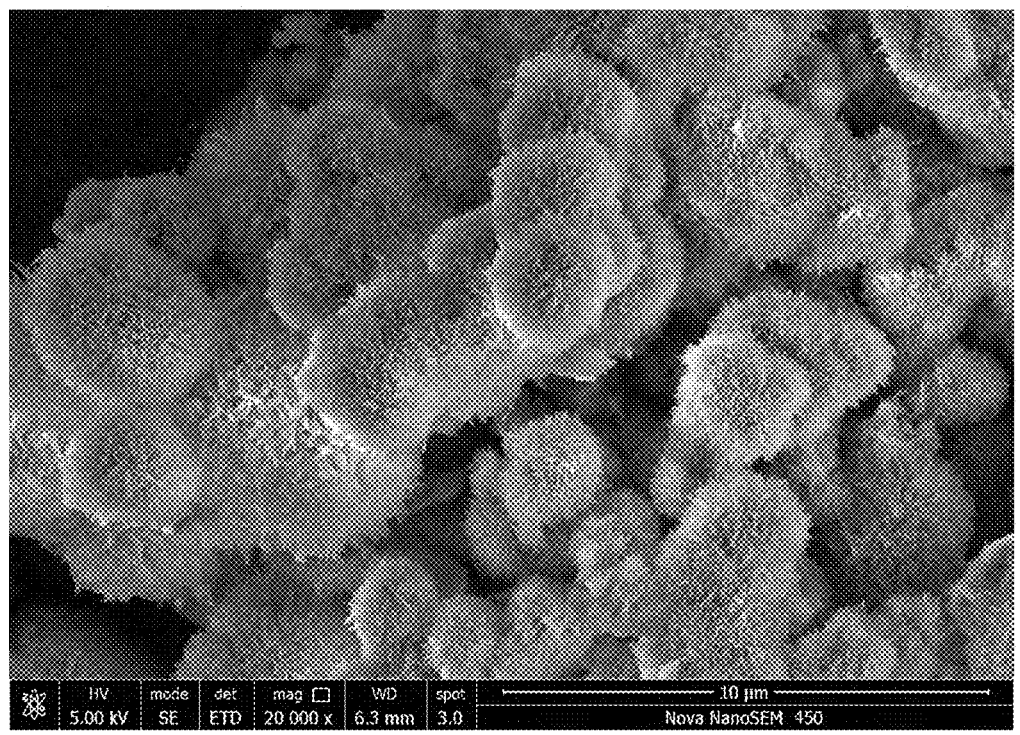
FIG. 3 illustrates a SEM image of the scallop shell extract efficient adsorbent P3 prepared in the embodiment 1 of the disclosure.

As illustrated in FIG. 3, the P3 has a porous microsphere structure with a diameter of 3 μm to 5 μm.

Figure 4:
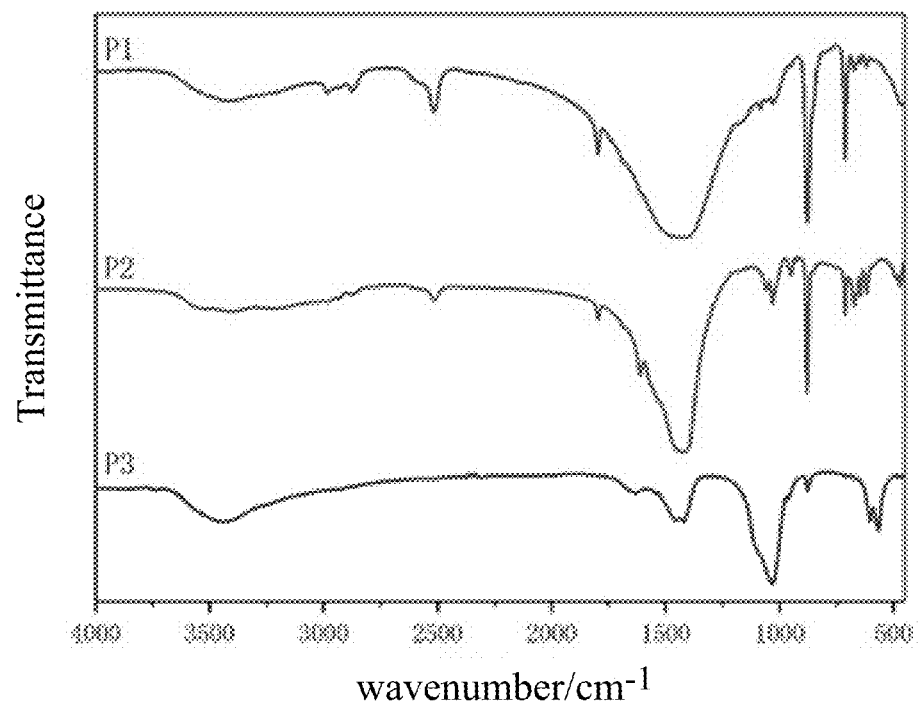
FIG. 4 illustrates a Fourier transform infrared (FTIR) spectrogram of the scallop shell extracts P1, P2, and P3 prepared in the embodiment 1 of the disclosure.

As illustrated in FIG. 4, 1796 cm$^{-1}$ for the P1, P2 is the C-O expansion and contraction vibration peak; 1420 cm$^{-1}$ (P1), 1418 cm$^{-1}$ are C-O antisymmetric expansion and contraction vibration; 878 cm$^{-1}$ (P1), 880 cm$^{-1}$ (P2) occur $CO_3^{2-}$ out-of-plane deformation vibration peak; 714 cm$^{-1}$ (P1, P2) is C-O in-plane deformation vibration peek. In the FTIR spectrum of the P3, 3400 cm$^{-1}$ is a main band of the O-H group, 1417 cm$^{-1}$ is a main band of $CO_3^{2-}$, and 1030 cm$^{-1}$ is caused by the Si-O-Si group. At 3400 cm$^{-1}$, 1417 cm$^{-1}$, 876 cm$^{-1}$ and 563 cm$^{-1}$, they may be caused by the adsorption of organic matter or $CO_3^{2-}$ in the scallop shells on surfaces of the P3 during reaction.

Figure 5:
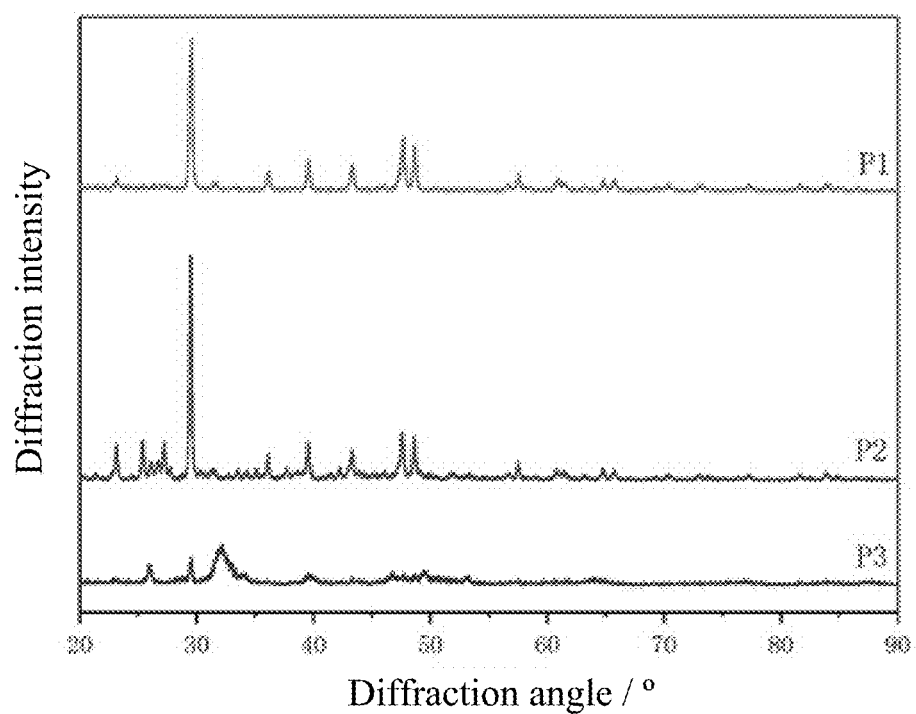
FIG. 5 illustrates X-ray diffraction (XRD) spectra of the scallop shell extracts P1, P2, and P3 prepared in the embodiment 1 of the disclosure.

As illustrated in FIG. 5, in the XRD spectrum of the P1, diffraction peaks at 23.20°, 29.56°, 36.10°, 39.54°, 43.32°, 47.64° and 48.62° are respectively corresponding to crystal planes (012), (104), (110), (113), (202), (018) and (116); and compared with the PDF standard card library, the diffraction peaks of the respective crystal planes of the P1 corresponds to diffraction peaks of standard $CaCO_3$ (JCPDS No. 83-0578). In the XRD spectrum of the P2, diffraction peaks at 23.14°, 29.50°, 36.10°, 39.50°, 43.28°, 47.58° and 48.58° are respectively corresponding to the crystal planes (012), (104), (110), (113), (202), (018) and (116); and compared with the PDF standard card library, the diffraction peaks of the respective crystal planes of the P2 corresponds to diffraction peaks of standard $CaCO_3$ (JCPDS No. 72-1214). In the XRD spectrum of the P3, diffraction peaks at 25.98°, 32.12° and 32.86° are respectively corresponding to crystal planes (006), (116) and (130); compared with the PDF standard card library, the diffraction peaks of the respective crystal planes of the P3 corresponds to diffraction peaks of standard $Ca_2SiO_4$. (JCPDS No. 77-0382); and at 29.56° and 39.50°, it shows the characteristics of $CaCO_3$, which may be caused by the adsorption of a small amount of $CaCO_3$ on the surfaces of the P3 during its formation.

Figure 6:
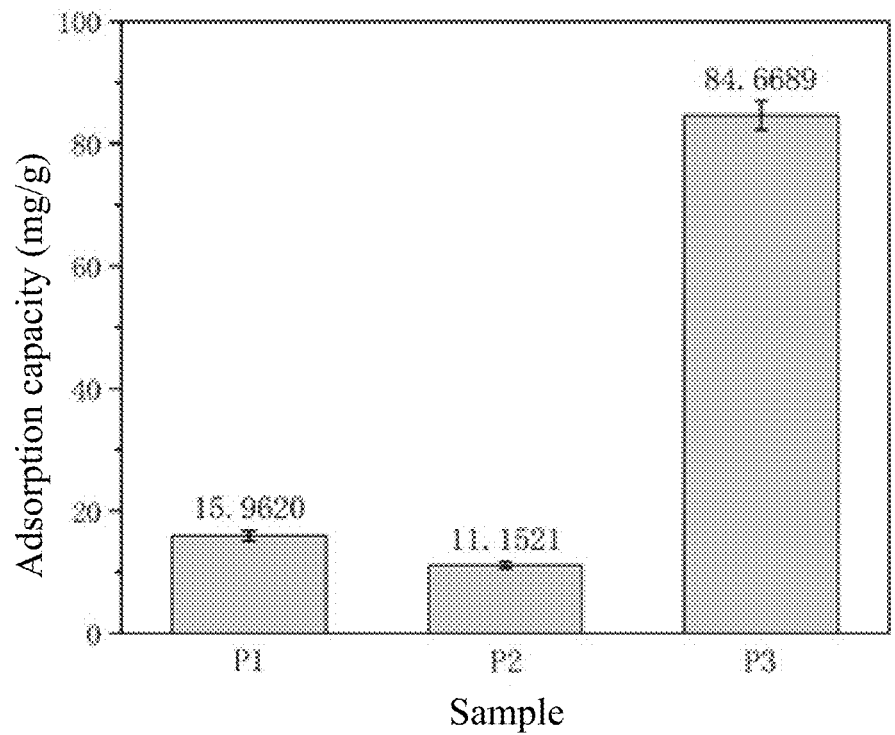
FIG. 6 illustrates a diagram of adsorption effects of the scallop shell extracts P1, P2, and P3 prepared in the embodiment 1 of the disclosure to CBB.

As illustrated in FIG. 6, maximum adsorption capacities of P1, P2 and P3 for the Coomassie brilliant blue (CBB) are 15.9620 mg/g, 11.1521 mg/g and 84.6689 mg/g, respectively.

Figure 7:
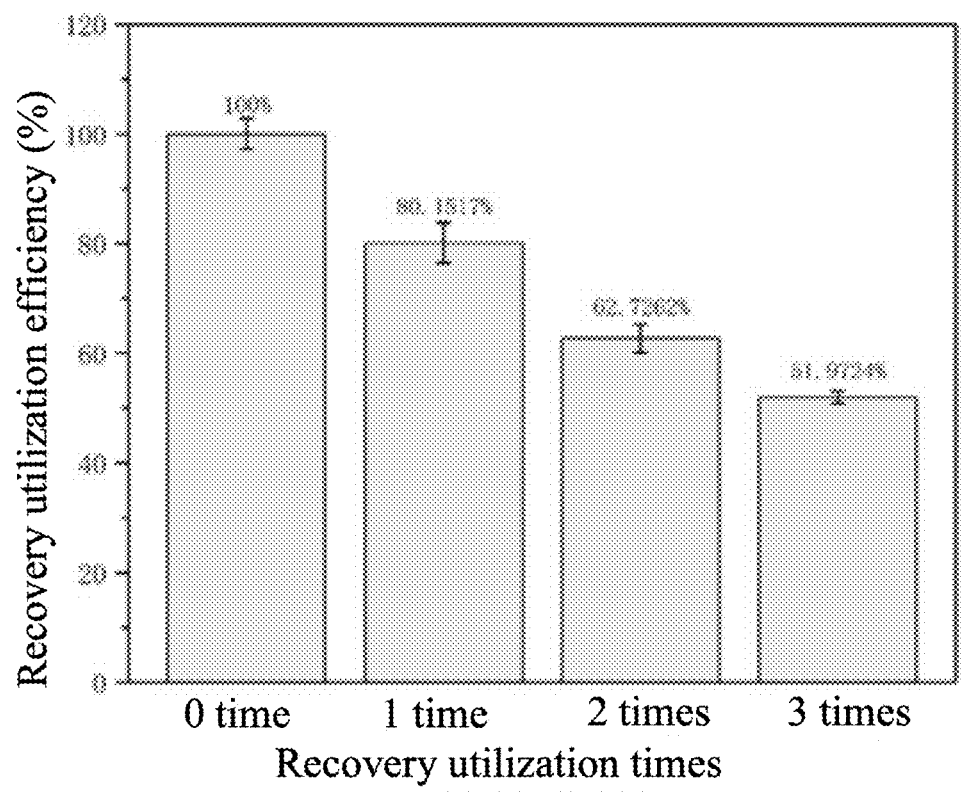
FIG. 7 illustrates a diagraph showing renewable efficiencies of the scallop shell extract efficient adsorbent P3 prepared in the embodiment 1 of the disclosure.

As illustrated in FIG. 7, the P3 has good renewability, and in three regeneration processes, recovery utilization efficiencies are 80.1517%, 62.7262% and 51.9724%, respectively.

The foregoing description is only preferred embodiments of the disclosure, and all equivalent changes and modifications made according to the scope of patent application of the disclosure should be covered by the appended claims of the disclosure.

What is claimed is:

1. A preparation method of a scallop shell extract efficient adsorbent, comprising the following steps:
   (1) rinsing scallop shells with water to remove impurities on surfaces of the scallop shells, and then naturally air-drying;
   (2) crushing air-dried scallop shells into small pieces, and heating in an oven to obtain heat-treated scallop shells (HSS);
   (3) putting the HSS into a thermostatic water bath oscillator to react with acetic acid at 150 revolutions per minute (rpm) and 25 degrees Celsius (° C.) for 24 hours (h), pouring out a residual solution (R1) of a reaction solution for storage, taking out remaining scallop shells (RSS1), rinsing three times with deionized water and drying;
   (4) reacting the RSS1 with acetic acid in the thermostatic water bath oscillator at 150 rpm and 25° C. for 24 h, decanting a residual solution (R2) for storage, taking out remaining scallop shells (RSS2), rinsing three times with deionized water and drying for later use;
   (5) reacting the RSS2 and acetic acid in the thermostatic water bath oscillator at 150 rpm and 25° C. for 24 h, taking out remaining scallop shells (RSS3), rinsing three times with deionized water and drying, pouring out a residual solution (R3) of a reaction solution for storage, and drying remaining precipitate (P3) to obtain the scallop shell extract efficient adsorbent, wherein a primary ingredient of the P3 is $Ca_2SiO_4$;
   (6) reacting the RSS3 with acetic acid in the thermostatic water bath oscillator at 150 rpm and 25° C. for 24 H to completely dissolve, and storing a residual solution (R4);
   (7) combining the R1, R2, R3 and R4 to prepare a calcium supplement, wherein a primary ingredient of each of the R1, R2, R3 and R4 is $Ca(CH_3COO)_2$, which is a calcium supplement.

2. The preparation method of the scallop shell extract efficient adsorbent as claimed in claim 1, wherein in the step (2), a heating temperature is in a range of 160° C. to 180° C., and a heating time is in a range of 70 h to 75 h.

3. The preparation method of the scallop shell extract efficient adsorbent as claimed in claim 1, wherein in the step (3), a mass of the HSS is in a range of 14.5 grams (g) to 15.5 g, a concentration of an acetic acid solution is 5 Vol. %, and a volume of the acetic acid solution is in a range of 220 milliliters (mL) to 230 mL.

4. The preparation method of the scallop shell extract efficient adsorbent as claimed in claim 1, wherein in the step (4), a mass of the RSS1 is in a range of 6 g to 7 g, a concentration of an acetic acid solution is 5 Vol. %, and a volume of the acetic acid solution is in a range of 70 mL to 80 mL.

5. The preparation method of the scallop shell extract efficient adsorbent as claimed in claim 1, wherein in the step (5), a mass of the RSS2 is in a range of 3.5 g to 4.5 g, a concentration of an acetic acid solution is 5 Vol. %, and a volume of the acetic acid solution is in a range of 70 mL to 80 mL.

6. The preparation method of the scallop shell extract efficient adsorbent as claimed in claim 1, wherein in the step (6), a mass of the RSS3 is in a range of 0.8 g to 1.2 g, a concentration of an acetic acid solution is 5 Vol. %, and a volume of the acetic acid solution is in a range of 45 mL to 55 mL.

* * * * *